United States Patent
Miyazaki et al.

(10) Patent No.: US 6,832,010 B2
(45) Date of Patent: Dec. 14, 2004

(54) IMAGE PROCESSING APPARATUS

(75) Inventors: Ryonosuke Miyazaki, Tokyo (JP); Tsuyoshi Endoh, Kanagawa (JP); Osamu Kizaki, Saitama (JP); Yoh Masuyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 767 days.

(21) Appl. No.: 09/737,960

(22) Filed: Dec. 18, 2000

(65) Prior Publication Data

US 2001/0012411 A1 Aug. 9, 2001

(30) Foreign Application Priority Data

Dec. 17, 1999 (JP) .............................. 11-360050

(51) Int. Cl.[7] ................................ G06K 9/54
(52) U.S. Cl. .................... 382/305; 358/1.16; 358/403
(58) Field of Search ................................. 382/305, 306; 358/1.15, 1.17, 403–404; 399/1, 8, 43, 101, 109, 11, 346; 235/375; 707/1–6, 104.1, 200–204; 715/520, 511, 522; 325/375

(56) References Cited

U.S. PATENT DOCUMENTS

| | | | |
|---|---|---|---|
| 5,434,650 A | 7/1995 | Nakahara et al. | 399/8 |
| 5,485,246 A | 1/1996 | Hayashi et al. | 399/1 |
| 5,510,876 A | 4/1996 | Hayashi et al. | 399/1 |
| 5,546,164 A | 8/1996 | Hayashi et al. | 399/8 |
| 5,583,615 A | 12/1996 | Hashimoto et al. | 399/8 |
| 5,694,201 A | 12/1997 | Hayashi et al. | 396/109 |
| 5,752,250 A * | 5/1998 | Minatogawa et al. | 707/200 |
| 5,784,663 A | 7/1998 | Hayashi et al. | 399/8 |
| 5,812,900 A | 9/1998 | Hashimoto et al. | 399/8 |
| 5,897,236 A | 4/1999 | Hashimoto et al. | 399/8 |
| 5,897,643 A * | 4/1999 | Matsumoto | 715/511 |
| 5,915,156 A | 6/1999 | Kizaki et al. | 399/346 |
| 5,923,013 A * | 7/1999 | Suzuki et al. | 235/375 |
| 5,966,564 A | 10/1999 | Kizaki et al. | 399/101 |
| 6,026,255 A | 2/2000 | Kizaki et al. | 399/43 |
| 6,122,457 A | 9/2000 | Kizaki | 399/11 |
| 6,363,178 B1 * | 3/2002 | Chiba et al. | 382/305 |

FOREIGN PATENT DOCUMENTS

EP  1 318 454 A2 * 11/2002 ........... G06F/11/14

* cited by examiner

Primary Examiner—Leo Boudreau
Assistant Examiner—Ishrat Sherali
(74) Attorney, Agent, or Firm—Oblon, Spivak, McClelland, Maier & Neustadt, P.C.

(57) ABSTRACT

An image processing apparatus includes a hard disk drive, an external image storing device for writing image data in a removable storing medium, and a memory for storing list data representative of a list of the image data stored in the hard disk drive or the storing medium. A main controller urges the operator of the apparatus to select, among the image data stored in the hard disk, desired image data to be written to the storing medium via an operation panel. When the image data selected are sequentially written to the storing medium, the main controller updates the list data of the memory every time one image data is written to the storing medium. After all the image data selected have been written to the storing medium, the controller updates the list data of the memory and causes the updated list data to be written to the storing medium.

40 Claims, 17 Drawing Sheets

Fig. 8

① SCANNER→WRITE + VIDEO MEMORY
② SCANNER→WRITE + VIDEO MEMORY + HD
③ SCANNER→WRITE
④ SCANNER→HD
⑤ VIDEO MEMORY→WRITE
⑥ VIDEO MEMORY→HD
⑦ HD→VIDEO MEMORY
⑧ HD→VIDEO MEMORY→SCSI CONTROLLER
⑨ SCSI CONTROLLER→VIDEO MEMORY→HD

Fig. 9

○ READ TO READ.  JOB # : 1

| DOCUMENT | SET | COPY |
|---|---|---|
| 0 | 10 | 0 |

SORT  STACK
STAPLE
CHECK

| AUTO PAPER SELECT | 1U A4Y | 2U A4T | 3U B4T | 4U A3T | TU A4Y | MANUAL FEED |

PAPER-PRIORITY MAG.CHANGE  | X1 | A3→A4 B4→B5 | A4→A3 A5→A4 | 93% | 100%

SIMPLEX→DUPLEX | DUPLEX→SIMPLEX | SIMPLEX SIMPLEX INTEG BY 2 | SMALLER

EDIT  DUPLEX/INTEG/DIV  MAG. CHANGE

TEXT / KIND OF DOCUMENT
AUTO DENSITY
《LIGHT  DARK》
SPECIAL DOCUMENT FEED

Fig. 16

| (IMAGE NO.) | (IMAGE START ADDRESS) | (IMAGE SIZE) |
|---|---|---|
| 0 0 0 1 | 0 0 7 5 0 | 2 |
| 0 0 0 2 | 0 0 7 7 0 | 3 |
| 0 0 0 3 | 0 0 8 0 0 | 2 |
| 0 0 0 4 | 0 0 8 2 0 | 1 |

Fig. 17

| | (OCCUPIED/ UNOCCUPIED) | (ADDRESS OF NEXT BLOCK) |
|---|---|---|
| 0 | 1 | 0 0 7 6 0 |
| 1 | 1 | E N D |
| 2 | 1 | 0 0 7 8 0 |
| 3 | 1 | 0 0 7 9 0 |
| 4 | 1 | E N D |

Fig. 18

| (FILE NO.) | (IMAGE NO.) |
|---|---|
| 0 0 1 | 001, 002, 003, 004 |
| 0 0 2 | 005, 006 |
| 0 0 3 | 007, 008, 009 |

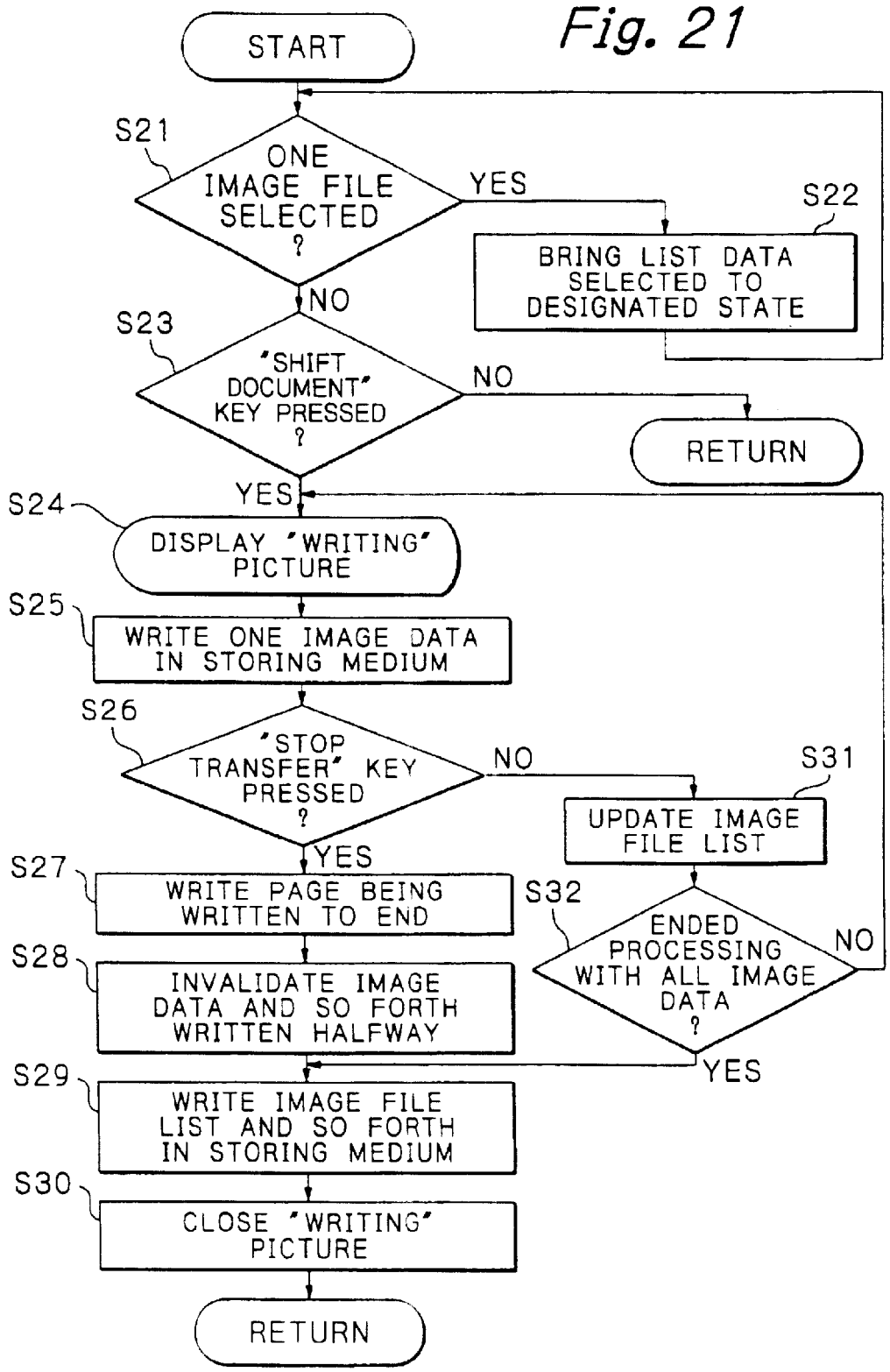

IMAGE PROCESSING APPARATUS

BACKGROUND OF THE INVENTION

The present invention relates to a digital copier or similar image processing apparatus and more particularly to an image processing apparatus capable of writing a plurality of image data stored in image storing means thereof in a removable storing medium.

Today, a digital copier of the type including a semiconductor memory, large-capacity hard disk or similar image storing means for storing document image data is available. This type of digital copier is capable of producing a plurality of copiers of a document by scanning the document only once or electronically sorting prints in order of page. Also, the copier is capable of storing image data output from a scanner or image data representative of text codes arranged in a bit map in a large-capacity hard disk, so that the image data can be output in the future.

Further, the image data stored in the hard disk can be transferred to a storing medium removably mounted to the copier for a backup or a long-time storage purpose. More specifically, the digital copier is provided with an external image storing device and an internal image storing device. The external image storing device writes or reads image data in or out of the removable storing medium. The internal image storing device stores image data read out of documents or image data transferred from the external image storing device. The removable storing medium may be implemented as a CD-R (CD Readable), CD-RW (CD-ReWritable), large capacity DVD (Digital Versatile Disk), data tape or similar mass storing medium.

Japanese Patent Laid-Open Publication No. 63-146555, for example, discloses an image processing apparatus constructed to store information and an operation procedure program necessary for copying in a removable storing medium together with image data. This apparatus is directed toward efficient manual operation.

Japanese Patent Laid-Open Publication No. 1-256269 teaches an image processing apparatus capable of storing not only image data but also information representative of the date of storage of the image data in a removable storing medium. This apparatus allows the image data to be rapidly read out when they are again printed on paper sheets.

It is a common practice with a conventional image processing apparatus including the internal image storing device, removable storing medium or similar image storing means to store image data representative of one or more pages, e.g., a single document in the storing means as a single image file. Attribute information including a particular file name is attached to each image file for management. Further, image file list data listing the file-by-file attribute information is produced. The image file list data is displayed to allow the operator of the apparatus to select a desired image file. The image file designated is read out of the image storing means on a file basis. The image data of the image file read out are displayed or printed on a paper sheet, as desired. Information indicative of correspondence between the image file names or file numbers and the locations thereof in the image storing means is prepared as one of management information. When the operator inputs a read request designating a desired document name, the apparatus accesses the location of the image storing means corresponding to an image file name identical with the document name and reads out an image file designated by the image file name.

It has been customary to update the image file list data and then write the updated information in the removable storing medium every time a single image file is written to the storing medium. This, however, reduces the life of, e.g., a CD-RW and increases the processing time.

SUMMARY OF THE INVENTION

It is therefore an object of the present invention to provide an image processing apparatus capable of reducing the rewrite processing of a removable storing medium in the event of updating of image file list data and thereby extending the life of the storing medium while reducing the processing time.

An image processing apparatus of the present invention includes an image storing device for storing image data representative of a single unit image or a plurality of unit images. A writing device writes the image data in a removable storing medium. A list data storing device stores list data listing the image data stored in either one of the image storing device and storing medium. A selecting device selects, among the image data stored in the image storing device, image data to be written to the storing medium. A controller updates, when the image data selected by the selecting device are written to the storing medium, the list data stored in the list data storing device every time the writing device writes one image data, and causes, after all the image information selected have been written to the storing medium, the list data to be written to the storing medium.

BRIEF DESCRIPTION OF THE DRAWINGS

The above and other objects, features and advantages of the present invention will become more apparent from the following detailed description taken with the accompanying drawings in which:

FIG. 8 is a table listing exemplary video paths available with the illustrative embodiment;

FIG. 9 is a view showing a specific picture associated with a copy application installed in the illustrative embodiment;

FIG. 16 is a table listing specific allocation data;

FIG. 17 is a table listing specific cluster information;

FIG. 18 is a table listing specific file information;

FIG. 21 is a flowchart representative of another alternative embodiment of the present invention.

DESCRIPTION OF THE PREFERRED EMBODIMENTS

Figure 1:
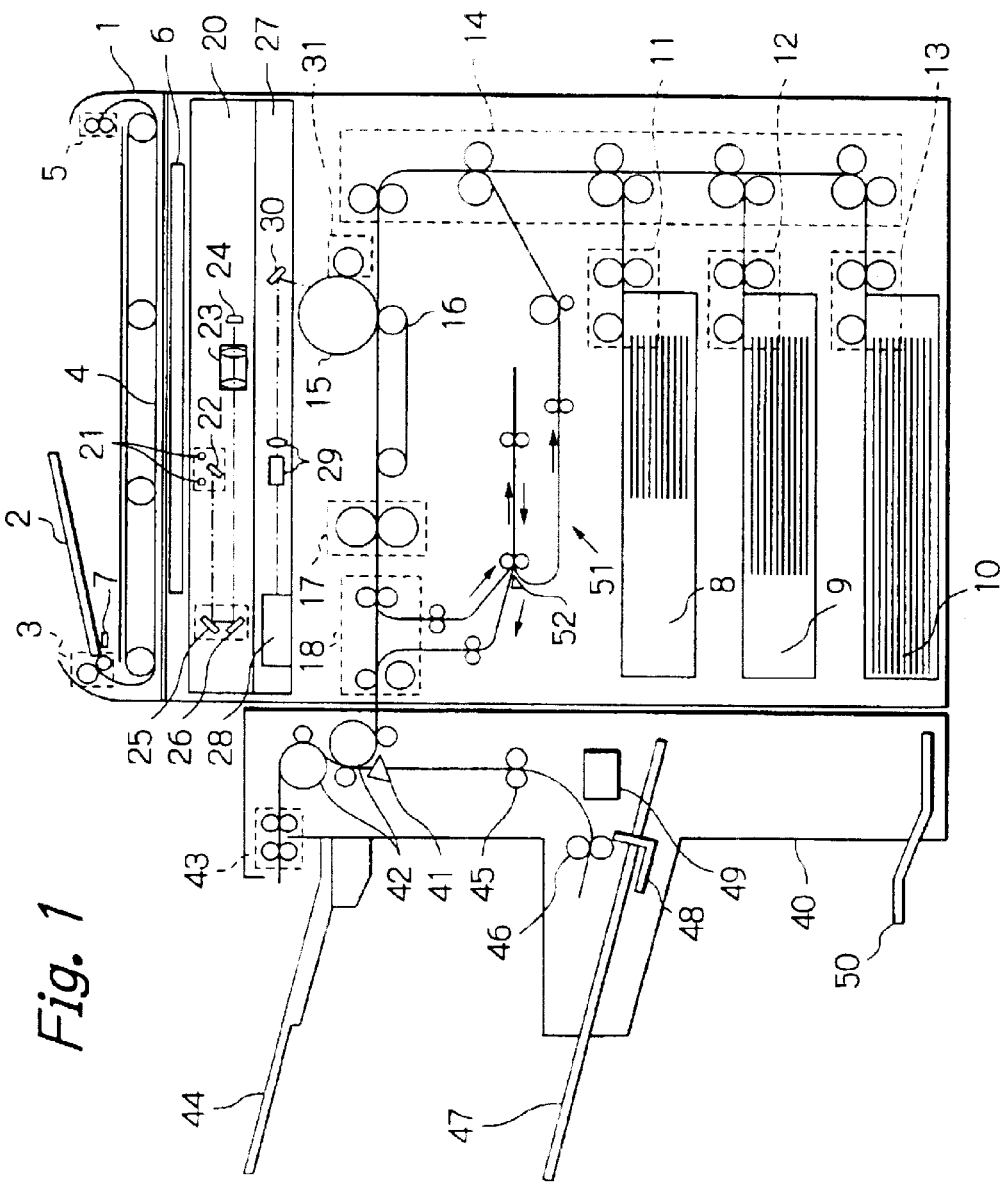
FIG. 1 is a view showing an image processing apparatus embodying the present invention.

Referring to FIG. 1 of the drawings, an image processing apparatus embodying the present invention is shown and includes an ADF (Automatic Document Feeder) 1. The operator of the apparatus stacks documents on a tray 2, which is included in the ADF 1, face up. The operator then presses a start key arranged on an operation panel, which will be described specifically later. In response, a feed roller 3 and a belt 4 cooperate to sequentially feed the bottom document to the top document to a preselected position on a glass platen 6. The apparatus has a function of counting the documents every time the feed of one document completes.

A reading unit 20 reads the image of the document positioned on the glass platen 6. The belt 4 and a discharge roller 5 cooperate to discharge the document read by the reading unit 20. When a document sensor 7 senses another document present on the tray 2, the document is conveyed to the glass platen 6 in the same manner as the previous document.

A first, a second and a third tray 8, 9 and 10 each are loaded with a stack of paper sheets. A first, a second and a third paper feeder 11, 12 and 13 feed the paper sheets from the first, second and third trays 8, 9 and 10, respectively. A vertical conveying unit 14 conveys the paper sheet fed from any one of the trays 8 through 10 to a position where the paper sheet contacts a photoconductive element 15. In the illustrative embodiment, the photoconductive element 15 is implemented as a drum. A writing unit 27 scans the drum 15 with a laser beam in accordance with image data output from the reading unit 20 to thereby form a latent image. A developing unit 31 develops the latent image and thereby produces a corresponding toner image. The toner image is transferred from the drum 15 to the paper sheet being conveyed by a belt 16 at a speed equal to the rotation speed of the drum 15. A fixing unit 17 fixes the toner image on the paper sheet. A paper discharging unit 18 discharges the paper sheet carrying the fixed image thereon to a finisher 40.

The finisher 40 selectively guides the paper sheet toward discharge rollers 42 or a stapling section. Specifically, a path selector 41 steers the paper sheet toward a print tray 44 via the discharge rollers 42 when positioned upward or steers it toward a staple tray 47 via rollers 45 and 46. Every time a paper sheet is driven out to the staple tray 47, a jogger 48 positions the edge of the paper sheet.

When a single copy, i.e., a single set of copies is completed on the staple tray 47, a stapler 49 staples it. The stapled copy drops onto a tray 50 due to its own weight. The print tray 44 is movable in a direction perpendicular to the direction of paper conveyance for every document or for an automatically sorted copy, thereby sorting prints.

In a duplex mode for forming images on both sides of a paper sheet, a path selector 52 is positioned upward. In this condition, the paper sheet fed from any one of the trays 8 through 10 and carrying an image on one side thereof is not steered toward the finisher 40, but is steered toward and laid on a refeeding unit 51. The refeeding unit 51 again feeds the paper sheet toward the drum 15, so that an image is formed on the other side of the paper sheet. At this instant, the path selector 52 is positioned downward in order to steer the above paper sheet, or duplex print, toward the path selector 41 included in the finisher 40.

A main motor, not shown, drives the drum 15, belt 16, fixing unit 17, paper discharging unit 18, and developing unit 31. The rotation of the main motor is transferred to the paper feeders 11 through 13 via clutches. Also, the rotation of the main motor is transferred to the vertical conveying unit 14 via an intermediate clutch.

The reading unit 20 includes scanning optics in addition to the glass platen 6. The scanning optics includes lamps 21, a first mirror 22, a lens 23, and a CCD (Charge Coupled Device) image sensor 24. The lamps 21 and first mirror 22, as well as a second mirror 25 and a third mirror 26, are mounted on a carriage not shown. A scanner motor, not shown, drives the scanning optics. The CCD image sensor 24 reads the image of a document and outputs a corresponding electric signal.

The writing unit 27 includes a laser unit 28, a lens 29 and a mirror 30. The laser unit 28 accommodates a laser diode and a polygonal mirror. A motor, not shown, causes the polygonal mirror to rotate at a high, constant speed.

The writing unit 27 emits a laser beam so as to scan the surface of the drum 15. A beam sensor, not shown, adjoins one end of the drum 15 and outputs a main scan synchronizing signal by sensing the laser beam.

Figure 2:
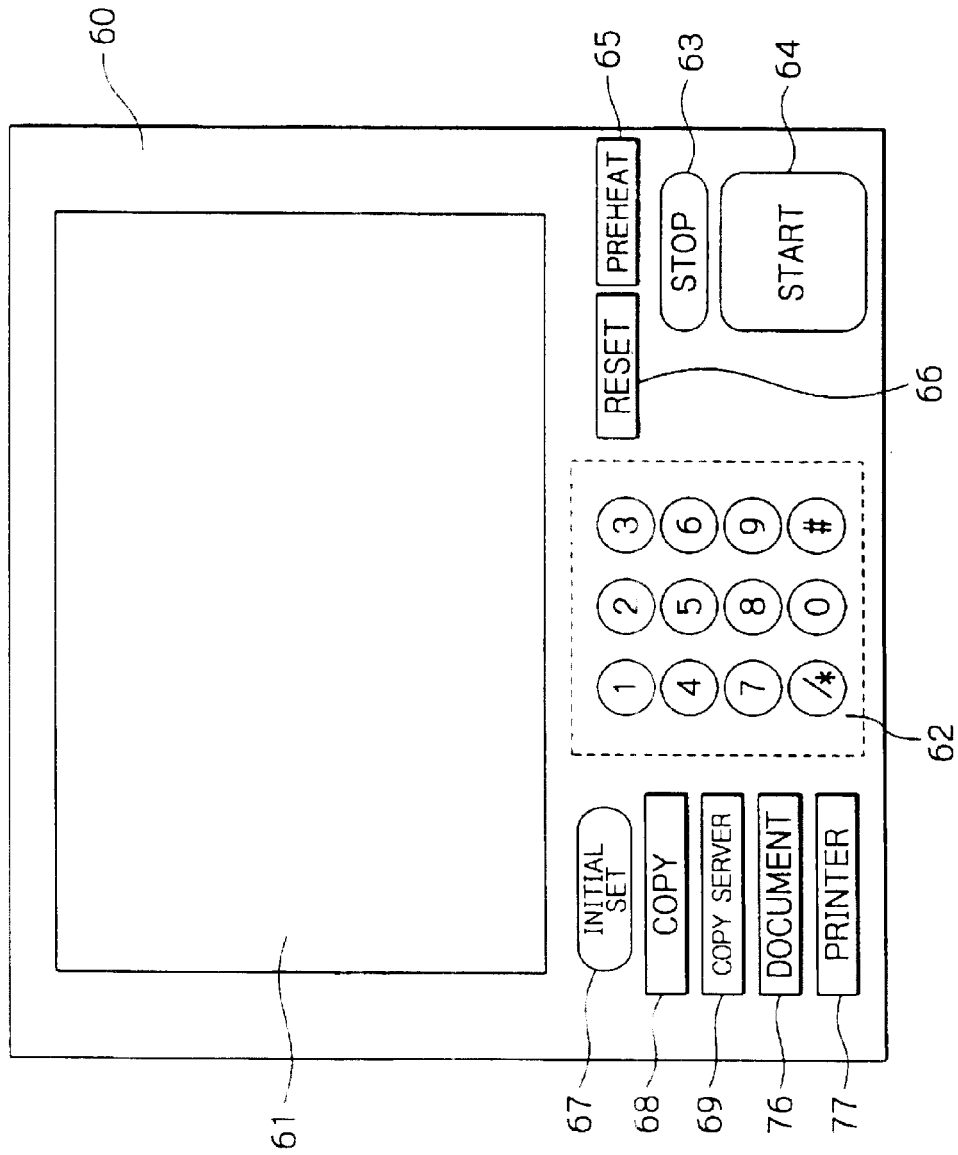
FIG. 2 is a fragmentary plan view of an operation panel included in the illustrative embodiment.

FIG. 2 shows a specific configuration of an operation panel 60 included in the illustrative embodiment. As shown, the operation panel 60 includes an LCD (Liquid Crystal Display) touch panel 61, numeral keys 62, a clear/stop key 63, a print key 64, a preheat key 65, a reset key 66, an initial set key 67, a copy key 68, a copy server key 69, a document key 76, and a printer key 77. The touch panel 61 displays function keys, the number of copies, messages representative of the statuses of the apparatus, and so forth.

By pressing the initial set key 67, it is possible to customize the initial conditions of the apparatus, as desired. With the key 67, it is also possible to set the sizes of paper sheets disposed in the apparatus or to set desired conditions to occur when a mode clear key, not shown, assigned to a copying function is pressed. Further, the key 67 allows an application to be selected when the operation panel 60 is not operated over a preselected period of time to be set. In addition, the key 67 allows a transition time to a power saving state to be set or allows a transition time to an automatic off/sleep mode to be set.

When the preheat key 65 is pressed, the apparatus in a stand-by state enters into a power saving state and lowers a fixing temperature and turns off indications on the operation panel 60. The copy server key 68 is used to read document images and store the resulting image data in an internal video memory, not shown, built in the apparatus or to print the stored image data. The document key 76 is used to edit, e.g., image data stored in the internal video memory.

Figure 3:
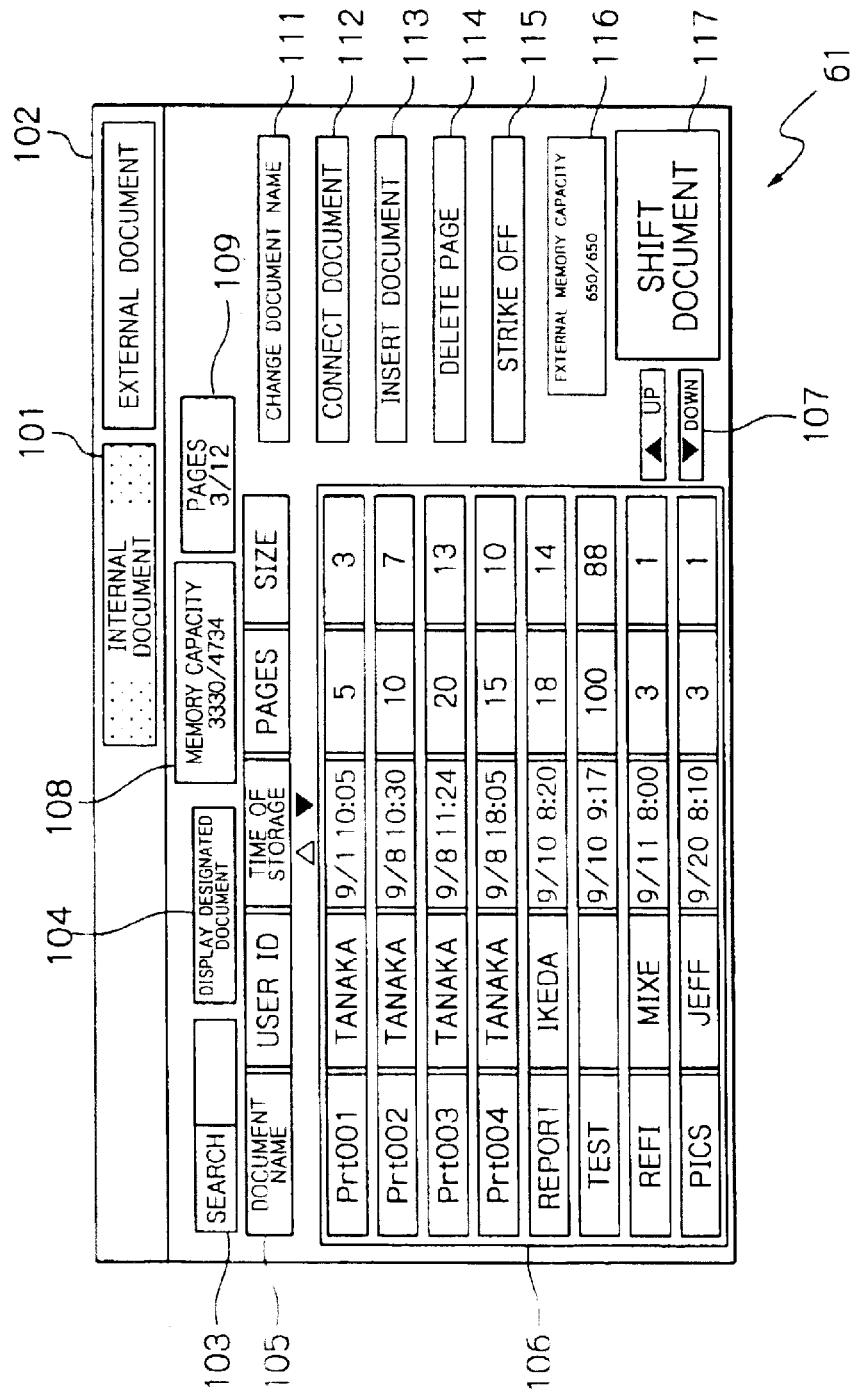
FIG. 3 is a view showing a specific picture to appear on an LCD (Liquid Crystal Display) touch panel mounted on the operation panel.

FIG. 3 shows a specific picture to appear on the touch panel 61 when the document key 76 is pressed. As shown, the picture includes various image file attribute information for specifying the image data stored in the internal video memory, i.e., user IDs (identification), document names, numbers of pages, times of storage, and data sizes (amounts of data). A user ID is assigned by a printer driver included in a personal computer, which is connected to the apparatus, and therefore displayed only at the time of storage using the printer function. A document name is attached every time an image is stored. A number of page is representative of the number of document images stored. A time of storage is representative of the time of storage of image data. Such image management information are stored in an NV-RAM (NonVolatile Random Access Memory) and therefore preserved even when a power switch, not shown, is turned off.

The picture shown in FIG. 3 further includes a "change document name" key 111, a "connect documents" key 112, an "insert document" key 113, a "delete page" key 114, a "strike off" key 115, and so forth. The "strike off" key 115 is used to strike the individual information, i.e., individual image file off image information (document) list data. The picture additionally displays the residual capacity of a removable storing medium.

Figure 4:
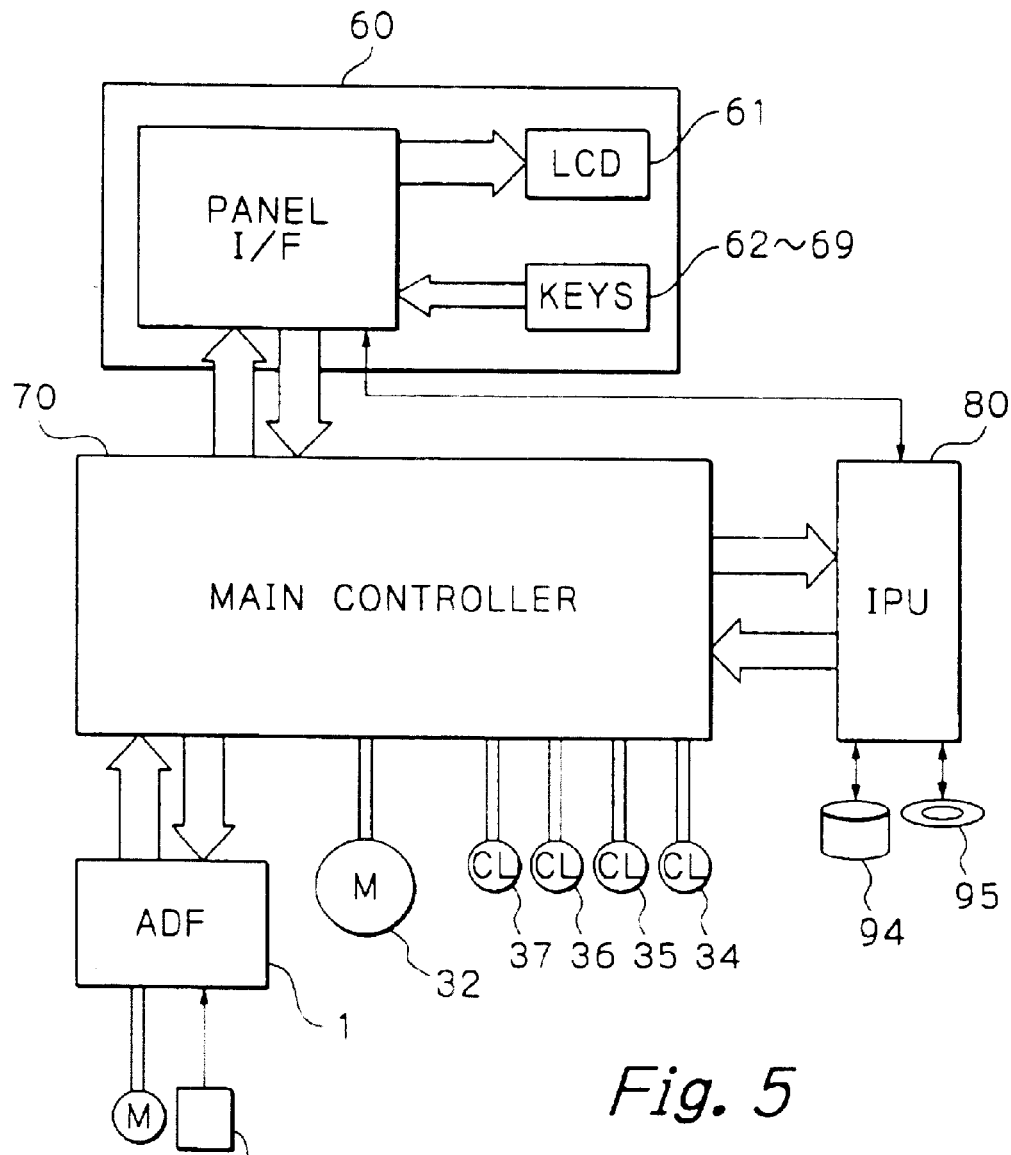
FIG. 4 is a block diagram schematically showing a control system included in the illustrative embodiment.

FIG. 4 shows a control system including a main controller 70. The main controller 70 controls the entire apparatus. The operation panel 60 is connected to the main controller 70. Also connected to the main controller 70 are an image processing unit (IPU) 80 and the ADF 1. The IPU 80 controls a scanner, controls the writing of document image data in the video memory, and controls image formation to be executed with the image data stored in the video memory. Further connected to the main controller 70 are a main motor 32 and clutches (CL) 34, 35, 36 and 37 necessary for, e.g., paper conveyance.

Figure 5:
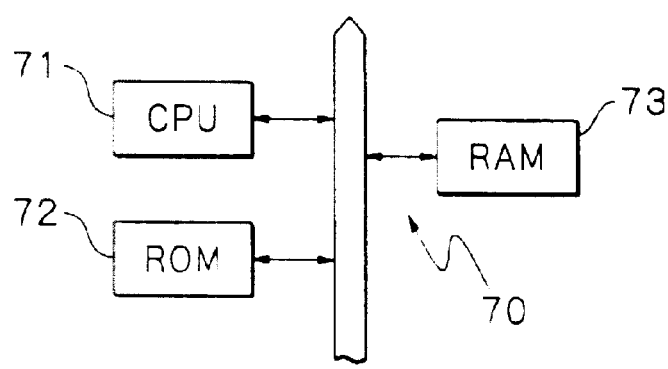
FIG. 5 is a schematic block diagram showing a main controller included in the control system specifically.

FIG. 5 shows essential part of the main controller specifically. As shown, the main controller 70 includes a CPU (Central Processing Unit) 71, a ROM (Read Only Memory) 72 storing a program to be executed by the CPU 71, and a RAM 73 for storing, e.g., interim data. If desired, the program may be partly stored in the ROM 72 and partly loaded from a hard disk drive, not shown, to the RAM 73.

Figure 6:
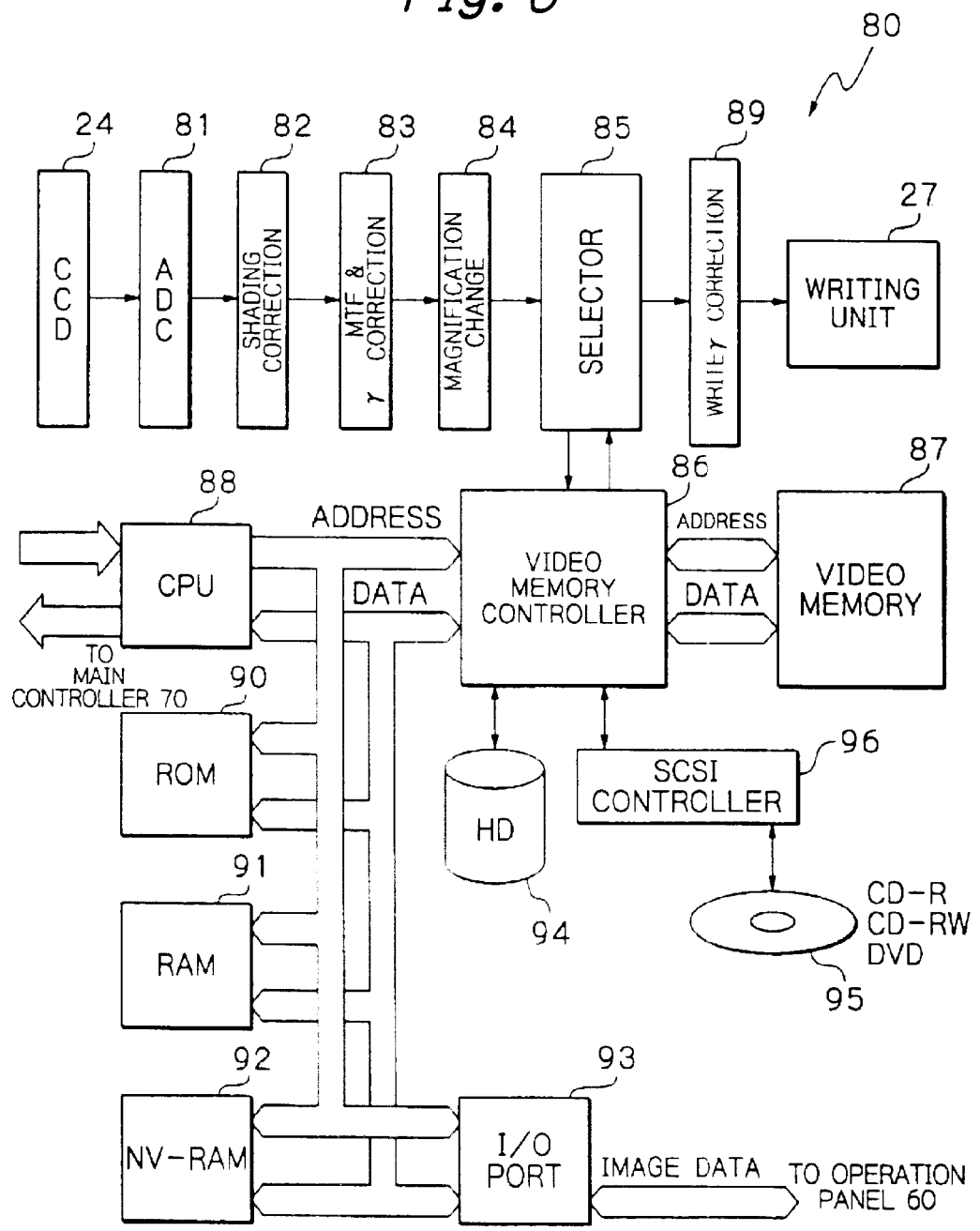
FIG. 6 is a schematic block diagram showing an image processing unit also included in the control system specifically.

Reference will be made to FIG. 6 for describing a specific configuration of the IPU 80. As shown, the IPU 80 includes the CCD image sensor 24 for transforming a reflection from a document, which is illuminated by the lamps 21, to an electric signal. An ADC (Analog-to-Digital Converter) 81 converts the electric signal to a digital signal or image data. A shading correction 82 executes shading correction with the image data. An MTF (Modulation Transfer Function) and γ correction 83 executes MTF and γ correction with the image data output from the shading correction 82. A magnification change 84 executes enlargement or reduction with the image data output from the correction 83 in accordance with a magnification change ratio selected. A selector 85 selectively delivers the image data output from the magnification change 84 to a write γ correcting unit 89 or a video memory controller 86. The write γ correcting unit 89 corrects the write γ of the image data in accordance with image forming conditions and feeds the corrected image data to the writing unit 27.

The video memory controller 86 and selector 85 are capable of interchanging image data with each other. The IPU 80 additionally includes a CPU 88, a ROM 90, a RAM 91, and an NV-RAM 92. The CPU 88 controls the setting of the video memory controller 86 and controls the reading unit 20 and writing unit 27. The ROM 90, RAM 91 and NV-RAM 92 store a program meant for the CPU 88 and data. The CPU 88 is capable of writing and reading data out of a video memory 87 via the video memory controller 86.

The video memory controller 86 includes a section for compressing the image data input via the selector 85. The compressed image data are written to the video memory 87. Image data with 256 tonality levels, which corresponds to the largest image size, may be directly written to the video memory 87 without compression, if desired. The illustrative embodiment compresses the image data in order to effectively use the limited capacity of the video memory 87. Further, the compression allows mass image data to be stored in the video memory 87 at a time, so that in a sort mode the image data can be read out of the video memory 87 in order of page. An expanding section also included in the video memory controller 86 sequentially expands the image data read out of the video memory 87.

Furthermore, image data representative of a plurality of documents may be sequentially written to the divided portions of the area of the video memory 87 corresponding to a single paper sheet. For example, image data representative of four documents may be sequentially written to the quadrisect areas of the video memory 87 corresponding to a single paper sheet. In such a case, the four documents will be combined and printed on a single paper sheet.

The CPU 88 is capable of accessing the image data stored in the video memory 87. This allows the image data stored in the video memory 87 to be reduced, cut out or otherwise processed. This can be done by writing control data in a register included in the video memory controller 86. The processed image data are again written to the video memory 87.

The video memory 87 is divided into a plurality of areas in accordance with the size of image data to be processed, so that the input and output of image data can be executed at the same time. For this purpose, the video memory 87 is interfaced to the video memory controller 86 by two sets of address and data lines, one for reading and the other for writing. This configuration allows image data to be written to, e.g., an area 1 and allows image data to be read out of an area 2 at the same time.

Further, the CPU 88 is capable of transferring the image data read out of the image data to the operation panel 60 via an I/O (Input/Output) port 93. Because display resolution available with the operation panel 60 is generally low, the image data read out of the video memory 87 are reduced, or thinned, and then sent to the operation panel 60.

A hard disk drive 94 may be used in addition to the video memory 87 because the video memory 87 stores mass image data. The hard disk drive 94 permanently stores image data even when a power switch provided on the apparatus is turned off. In this case, the video memory 87 and hard disk drive 94 constitute the internal memory or image storing means. The video memory 87 constitutes the image storing means alone when the hard disk drive 94 is absent. It is a common practice to use the hard disk drive 94 when a plurality of regular or formatted documents are read by a scanner and stored.

An external image storing device 95 includes a removable storing medium, e.g., CD-R, CD-RW or DVD. An SCSI (Small Computer System Interface) controller 96 controls the bus of the external image storing device 95 in the event of writing or reading of image data. At this instant, the image data are once written to the video memory 87 in order to absorb differences between the above writing or reading operation and the image formation and read-out from the scanner. More specifically, image data output from the scanner are written to the external image storing device 95 by way of the video memory 87 without exception. Also, image data read out of the external image storing device 95 are sent to the writing unit 27 by way of the video memory 27 without exception.

The video memory controller 86 determines a video path when image data are written to or read out of the video memory 87, hard disk drive 94 or external image storing device 95, when image data output from a scanner (e.g. reading unit 20) are input, or when the image data to be sent to the writing unit 27 are output. FIG. 8 shows some specific video paths. The CPU 88 determines the destination of image data to be input or output, allowing the video memory controller 86 to switch the flow of image data.

Figure 7:
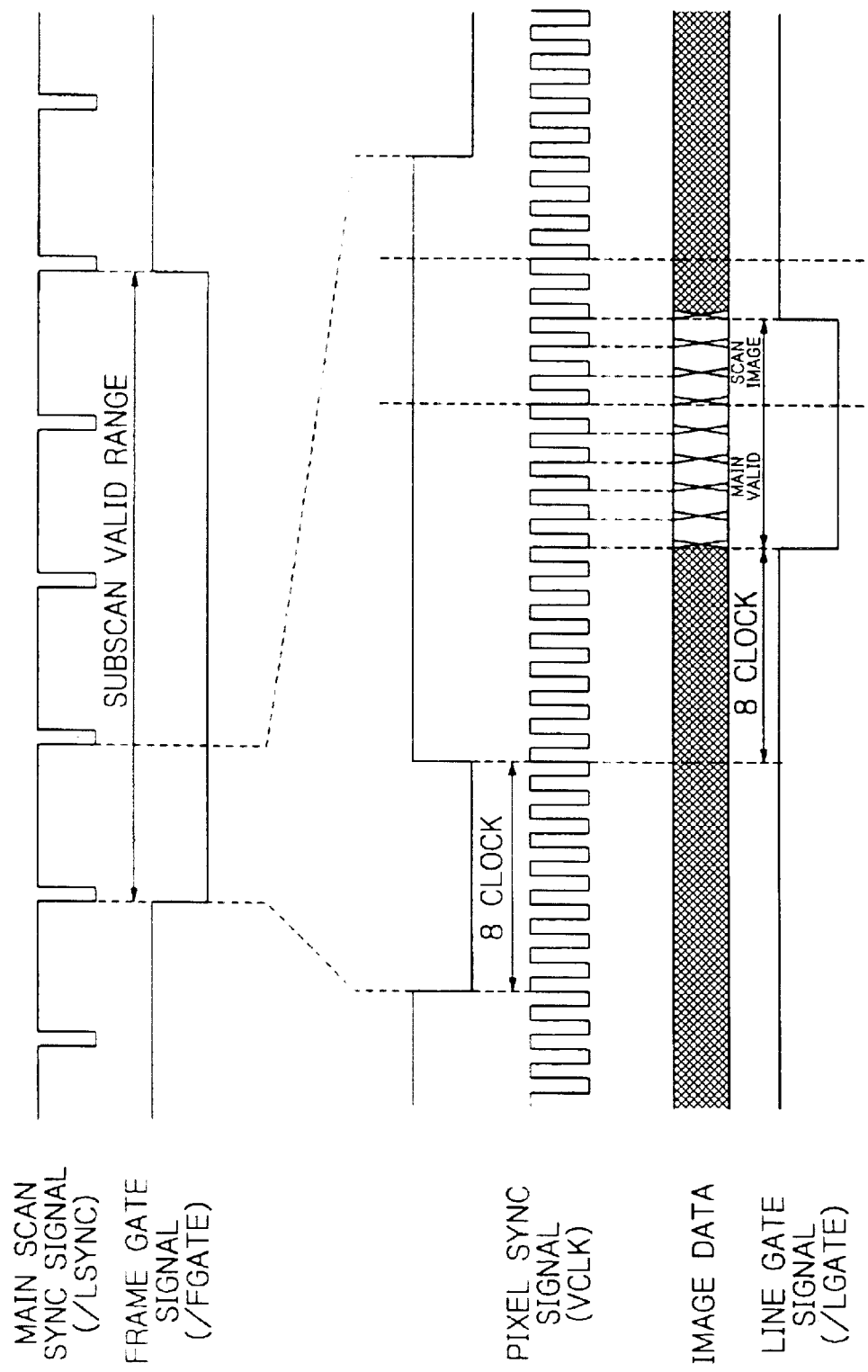
FIG. 7 is a timing chart demonstrating a specific operation of the control system.

FIG. 7 shows a specific transfer timing of one page of image data via the selector 85. In FIG. 7, /FGATE is representative of a valid period of one page of image data in the subscanning direction. /LSYNC is representative of a line-by-line main scan synchronizing signal; the image data is validated by a preselected clock after the positive-going edge of the signal /LSYNC. A signal /LGATE indicates that the image data in the main scanning direction is valid. These signals are synchronous to a pixel clock VCLK. A single pixel, eight bits (256 tonality levels) of data is input to the selector 85 for a single period of the pixel clock VCLK. In the illustrative embodiment, image data are printed on a paper sheet at a density of 400 dpi (dots per inch) while the maximum number of pixels is 4,800 in the main scanning direction and 6,800 in the subscanning direction. Also, image data are assumed to approach a white image as they approach 255.

FIG. 9 shows a specific picture available with a copy application, which is one of applications installed in the apparatus. The copy application is conventional and will be note described specifically.

Figure 10:
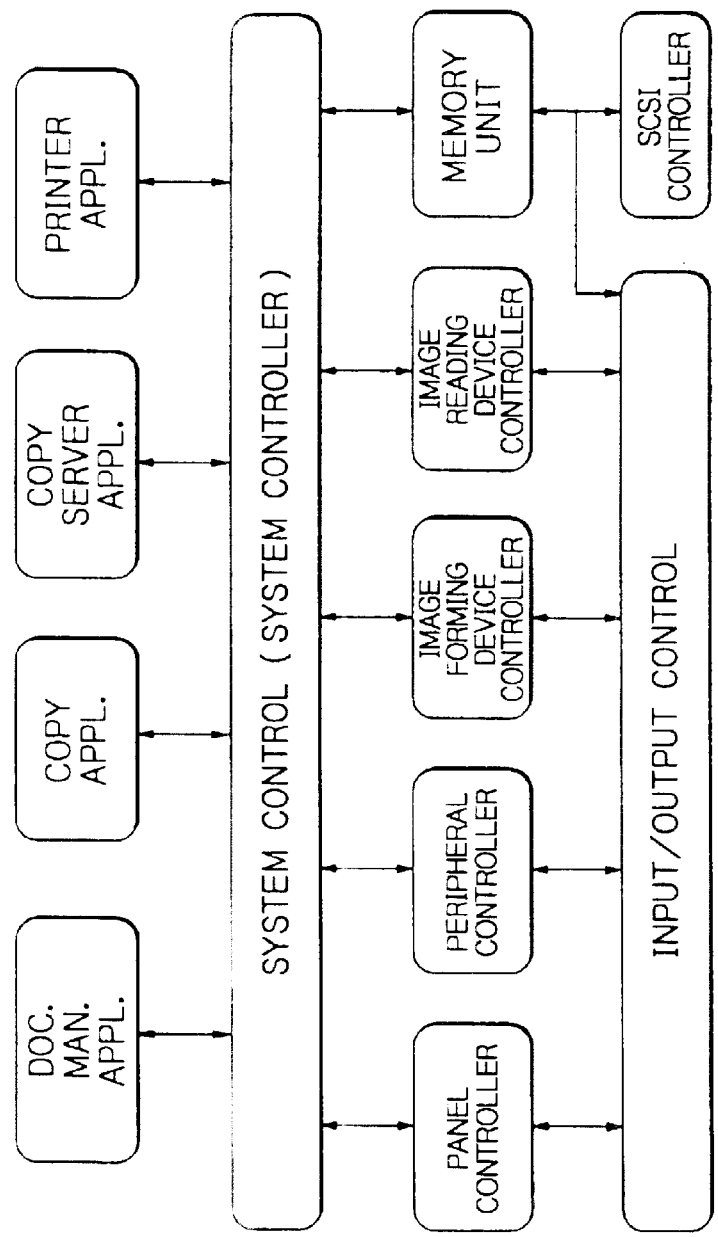
FIG. 10 is a schematic block diagram showing the system of the illustrative embodiment.

Reference will be made to FIG. 10 for describing a specific system configuration of the apparatus. As shown, the system includes a copy server application processing section (COPY SERVER APPL.) consisting of hardware and software. This processing section plays the role of means for processing the image data stored in the internal image storing device. The system additionally includes a copy application processing section (COPY APPL.), a printer application processing section (PRINTER APPL.), and a document management application processing section (DOC. MAN. APPL.). These processing sections each operate independently of the others. A system controller arbitrates the operation panel, or shared resource, 60 and a panel, a peripheral unit (e.g. ADF 1) and a peripheral unit controller, an image forming device (e.g. writing unit 27) and a device controller, the image reading device (e.g. reading unit 20) and a device controller, and a memory unit. Such controllers are implemented by the main controller 70 and IPU 80.

Operation picture information associated with the application processing sections each can be written in a particular virtual picture region provided by the panel controller (memory region corresponding to an actual picture). More specifically, the panel controller arranges the operation picture information designated by the system controller in an actual picture and displays it. When the external image storing device 95 is implement as a unit separate from the apparatus, it is connected to the connection portion of the SCSI controller 96, FIG. 5, and controlled by the SCSI controller 96.

Figure 11:
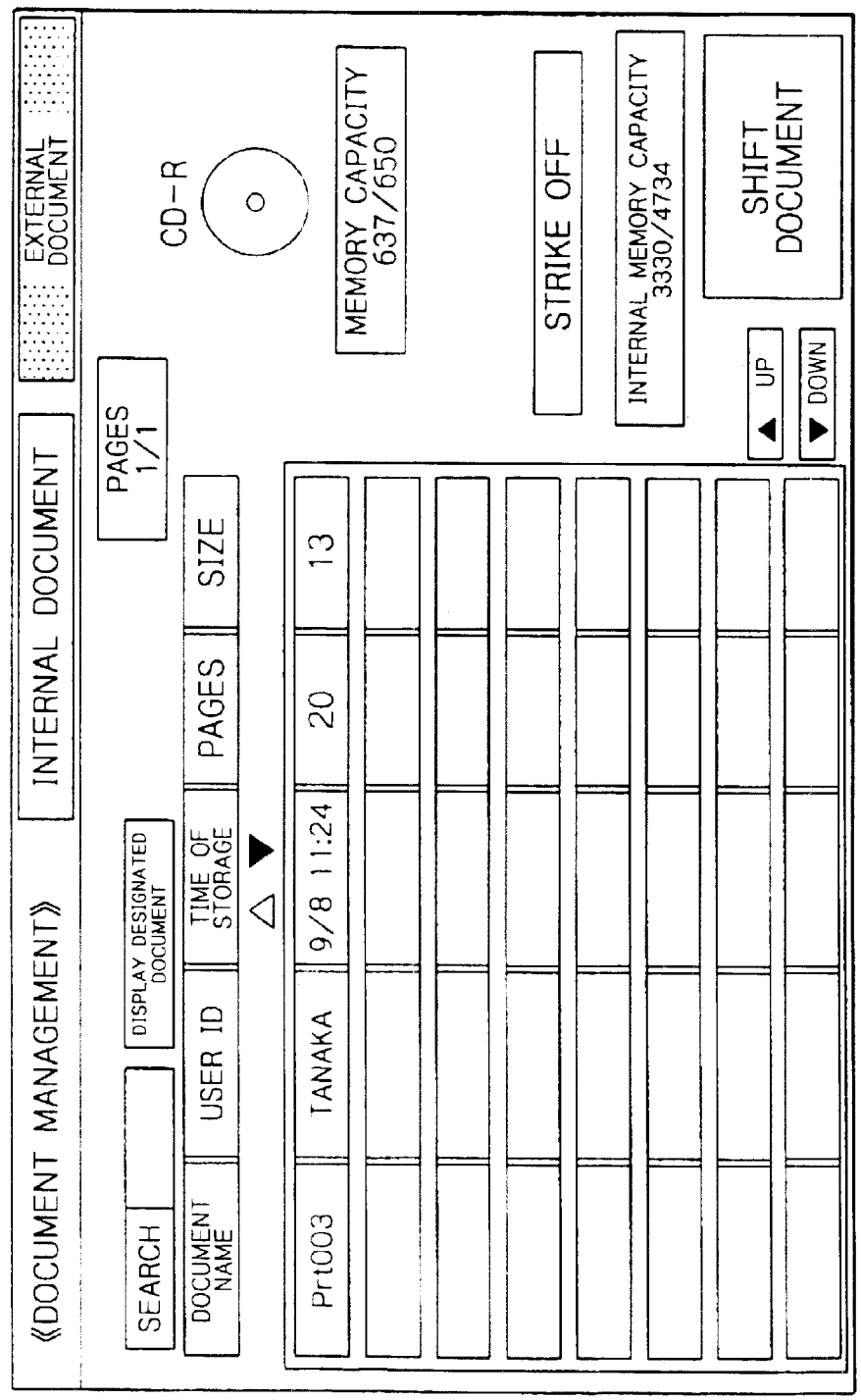
FIG. 11 is a view showing a specific picture to appear on the LCD touch panel when an external document key is pressed.

Referring again to FIG. 3, the picture to appear on the touch panel 61 when the document key 76 is pressed will be described more specifically. With this picture, the operator is capable of using various functions relating to image data stored in the hard disk drive 94 and image data stored in the external image storing device 95, as stated earlier. In the specific picture, an internal document key 101 is reversed in black in order to show the operator that image data stored in the hard disk drive 94 can be edited. When the operator touches an external document key 102, a specific picture shown in FIG. 11 appears in place of the picture of FIG. 3. The picture of FIG. 11 allows the operator to edit image data stored in the removable storing medium.

The picture shown in FIG. 3 includes a display area 106 for displaying attribute information (image file list data) particular to image files, including image data, stored in the hard disk drive 94. The attribute information include document names, user IDs, times of storage, numbers of pages, data sizes, and so forth, as stated previously. A document name is attached every time an image file is stored. The number of pages is representative of the number of document images. A time of storage is representative of the date (month, day, hours and minutes) of storage of an image file. While the attribute information of only eight image files are shown in FIG. 3, the operator may touch an up key or a down key 107 in order to see the attribute information of other image files, as desired.

Another display area 109 shows the number of pages listing the attribute data of all image files (image file list data) and the page number assigned to the attribute information of eight image files being displayed. Specifically, in FIG. 3, the display area 109 shows that the image file list data are listed on twelve consecutive pages, and that the current page being displayed is the third page. When the operator touches any item in a display area 105, the list data in the display area 106 are sorted in accordance with the item; in FIG. 3, the list data are sorted in order of time of storage. A search key 103 may be used to search the list data.

When the operator touches a desired image file line in the display area 106, the line is reversed in black (designated state hereinafter). The operator can designate image file list data of a plurality of image files. When the operator touches a "display designated document" key 104, only the image file list data in the designated state appear in the display area 106. A display area 108 shows the total capacity and residual capacity (megabytes) of the hard disk drive 94. A display area 116 shows the total capacity and residual capacity (megabytes) of the storing medium loaded in the external image storing device 95.

As for the editing function, the operator may touch desired one of the previously mentioned keys 111 through 115.

Figure 12:
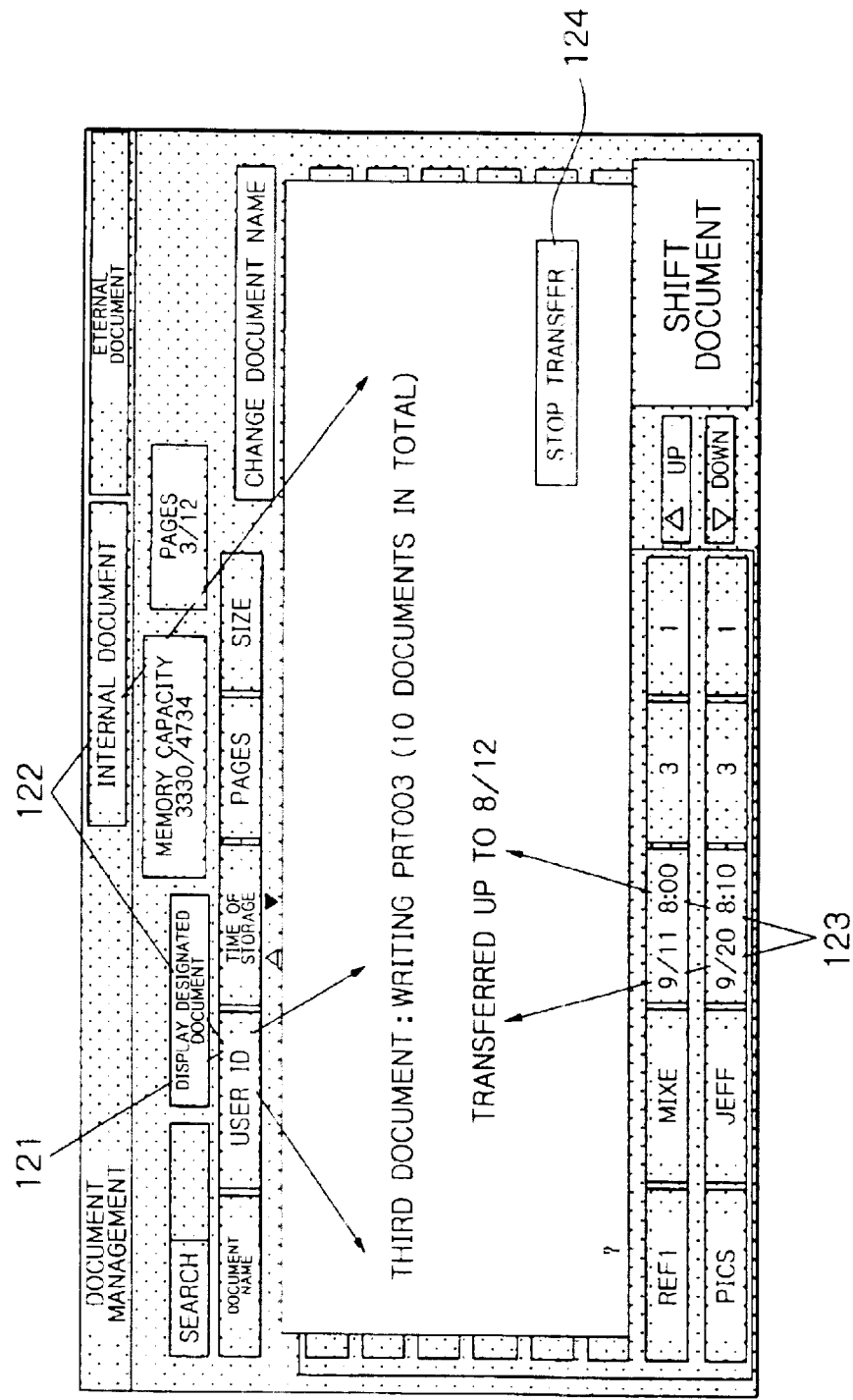
FIGS. 12 and 13 are views each showing a particular picture to appear on the LCD touch panel for indicating the progress of write processing.
Figure 13:
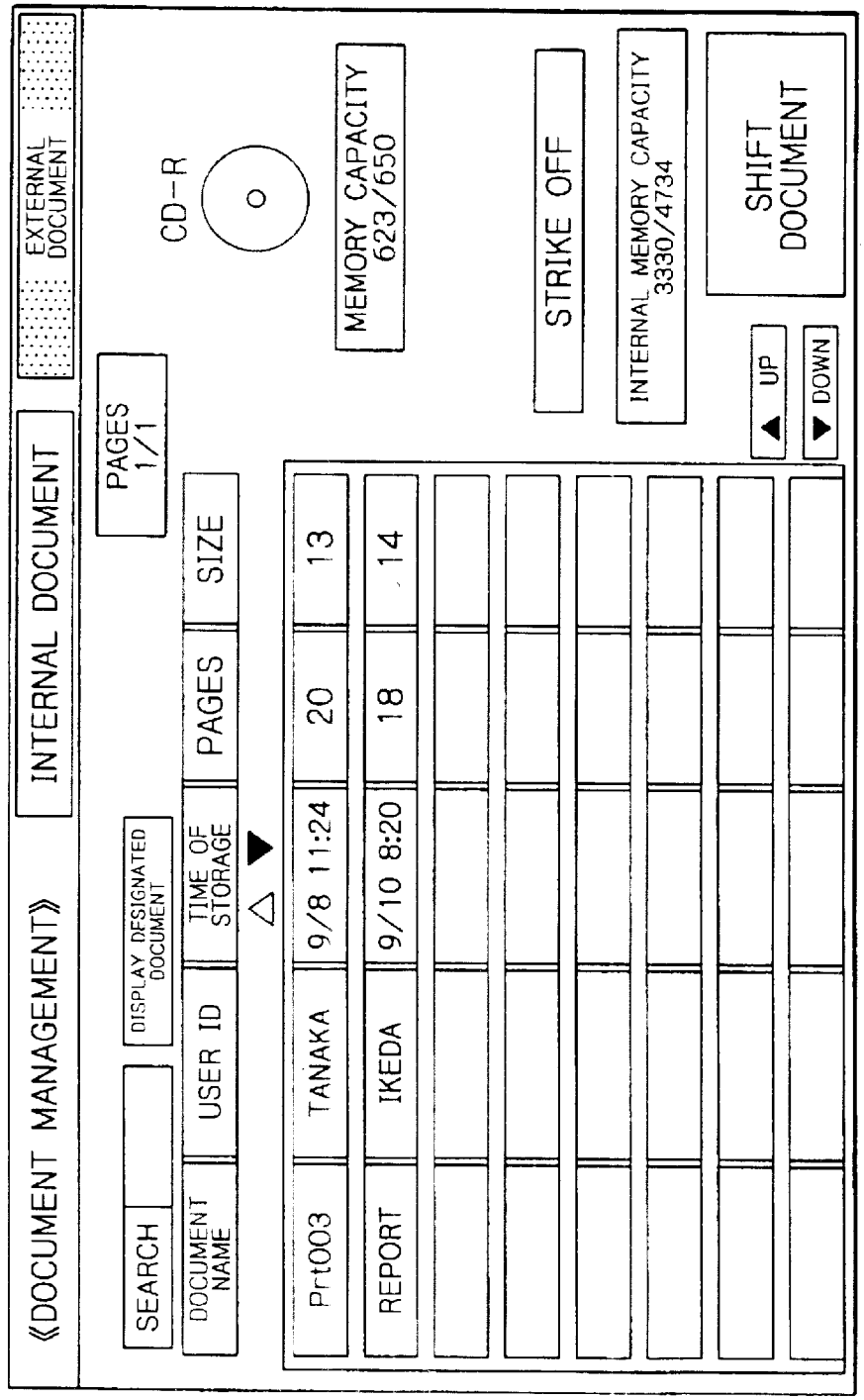

Further, when the operator touches desired image file lines in the image file list and then touches a "shift document" key 117, the image data and image file list data of the image files in the designated state are written to the removable storing medium. At this instant, image file list data attached to image files stored in the removable storing medium are updated. Several seconds are necessary for such a procedure to complete. In light of this, a picture representative of the progress of the procedure is displayed on the touch panel 61, as shown in FIG. 12. As shown, the picture includes the name 121 of a document being written to the storing medium and contents shown in display areas 122 and 123. The display area 122 shows which of the image files (corresponding to the document names) is being written to the storing medium. The display area 123 shows which of the pages of the image file being written in the storing medium. When the operator touches the external document key 102, the image file list data of the image files so updated are added to the touch panel 61, as shown in FIG. 13.

In the illustrative embodiment, the main controller 70 generates allocation data (FAT) for managing the image data stored in the internal image storing device and external storing medium on a unit image basis, e.g., on a page basis, file structure information for managing one or more unit images as a single image file, and cluster information for managing, e.g., the occupied/unoccupied statuses of blocks (clusters) constituting the unit images. The main controller 70 writes such information in the storing medium or similar image storing means together with corresponding image data.

Figures 14, 15:
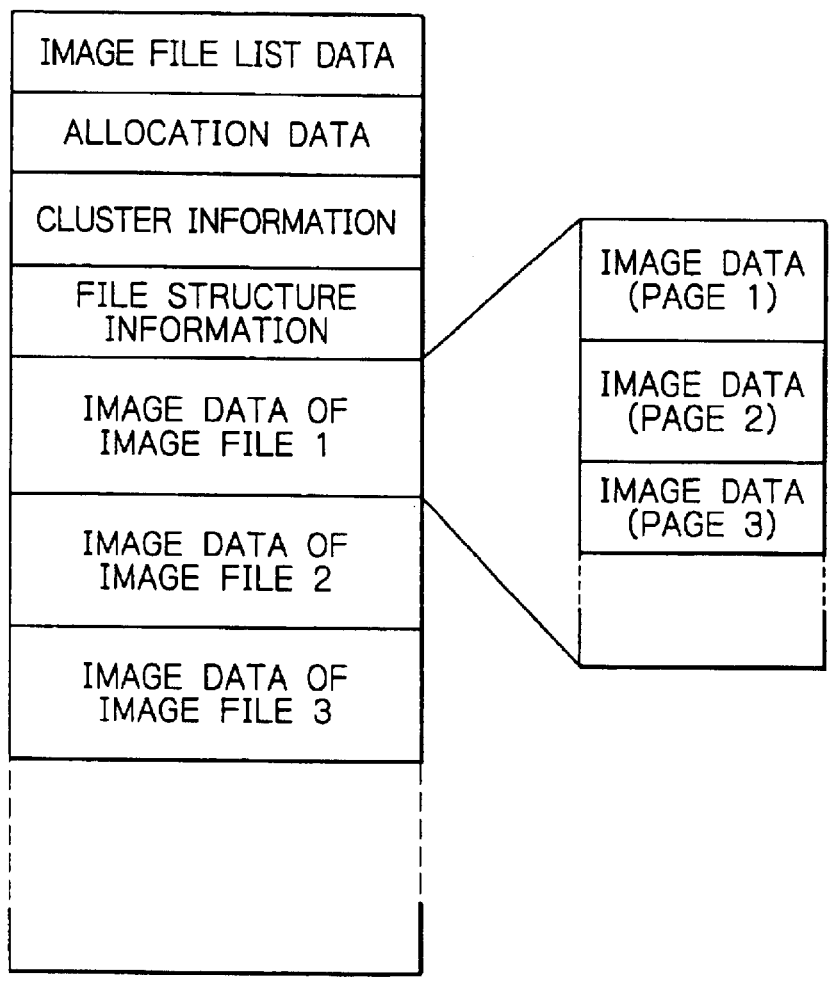
FIG. 14 is a view showing a specific format of information generated by the illustrative embodiment.
FIG. 15 is a table listing information representative of records each corresponding to a particular image file shown in FIG. 14.

FIG. 14 shows a specific group of information including the image file list data, allocation data (FAT), cluster information, and file structure information. Such a group of information is stored in the hard disk drive 94 and the storing medium mounted to the external image storing device 95. As shown, the first field stores the image file list data. As shown in FIG. 15 specifically, the first field stores document names (file names), user IDs and times of storage each relating to a particular record (line), which corresponds to a particular image file. These information appear in the display area 106 shown in FIG. 3. In addition, the above field stores file numbers each being attached to a particular image file.

FIG. 16 shows specific allocation data. As shown, each record (line) consists of an image number attached to a unit image (e.g. one page), the image start address of the first block (cluster) in which the image data of the unit image is stored, and image size information representative of the number of blocks of the image unit. It is to be noted that the word "address" refers to one of serial numbers sequentially attached to divided memory regions of equal size.

FIG. 17 shows specific cluster data stored in a field next to the allocation data field. As shown, each record consists of information representative of occupied/unoccupied and the address of the next block allocated to the unit image designated by the image number. If the next block allocated to the unit image is absent, "END", for example, may be written in place of the address.

In FIG. 17, continuous blocks are assigned to the unit image. However, some blocks may be skipped because the unoccupied blocks are not only continuous. Numbers positioned at the left-hand side of FIG. 17 are block numbers. Again, "occupied" and "unoccupied" are represented by "1" and "0", respectively. If desired, "END" indicative of the last block may be replaced with an address value not occurring in practice (e.g. 99999). Further, an address value not occurring in practice (e.g. 88888) may be written in the region assigned to the next block addresses in place of the occupied/unoccupied region, in which case a block with such an address value will be determined to be unoccupied.

FIG. 18 shows specific file structure information stored in a field next to the cluster data field. As shown, assuming that a unit image included in an image file is one page, then each record corresponding to a particular file stores image numbers attached to consecutive pages in order of page. This field additionally stores file attribute information that does not appear in the picture of FIG. 3, e.g., information to be used at the time of printing.

The file structure information field is followed by consecutive image file fields. When a unit image included in an image file is one page, the first page, second page and so forth are sequentially stored in this order. Because regions to be allocated to such consecutive pages are not always continuous, a plurality of unoccupied blocks are obtained on the basis of the cluster information, and then the pages are sequentially stored in the unoccupied blocks. It follows that the unoccupied blocks are not continuous, i.e., the region where a single file of image data is stored is not continuous.

Also, if one page of image data overflows one block, the image data is sometimes not continuous.

Figure 19:
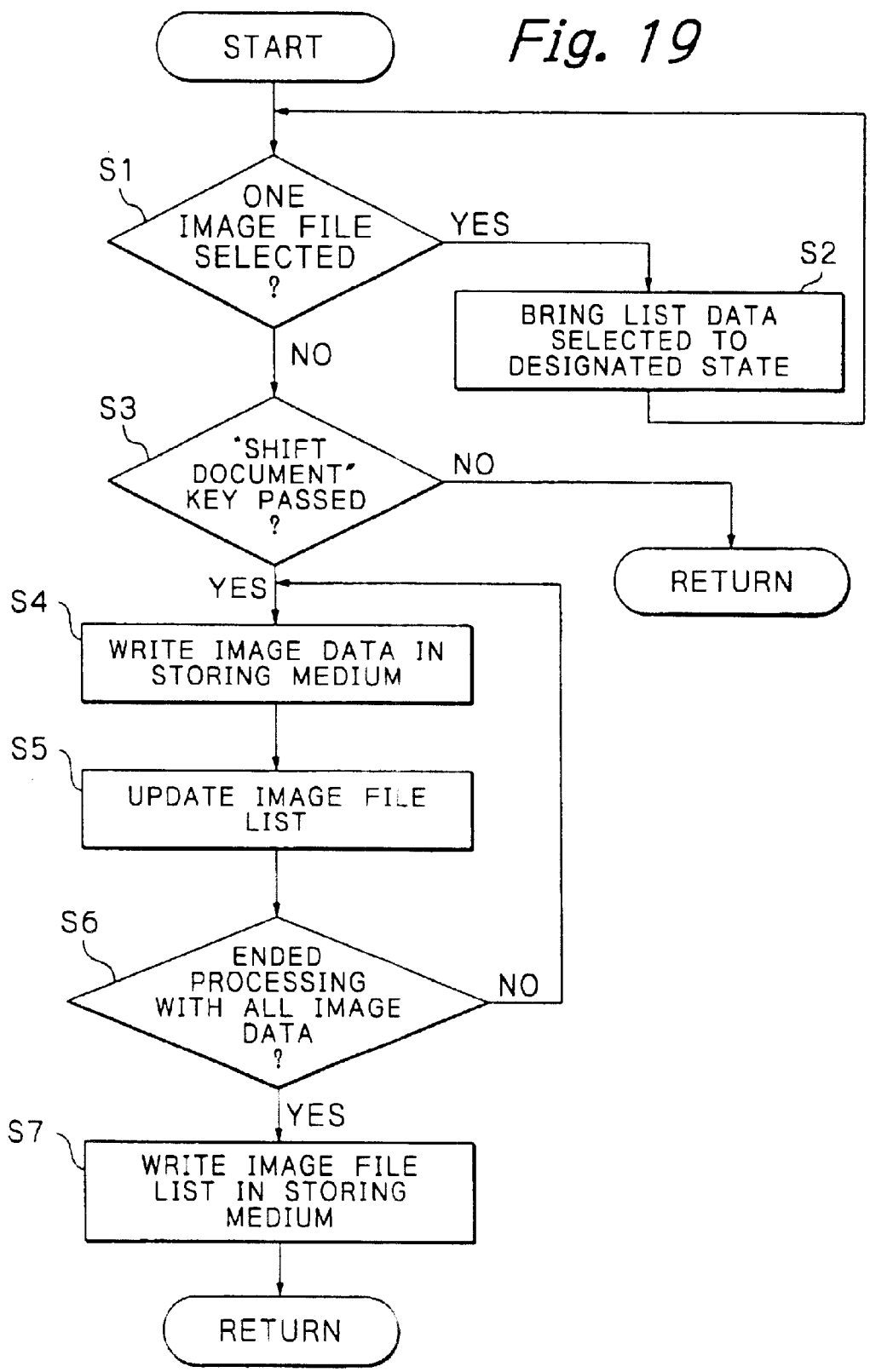
FIG. 19 is a flowchart demonstrating a specific operation of the illustrative embodiment.

Assume that a CD-RW or similar storing medium is removably mounted to the external image storing device 95, and that a plurality of image files stored in the hard disk drive 94 should be written to the storing medium. FIG. 19 demonstrates a specific operation to be executed by the illustrative embodiment in the above assumed conditions. The storing medium is assumed to have stored some image files beforehand.

First, the operator presses the document key 76 on the operation panel 60. In response, the main controller 70 recognizes the manipulation and reads the image file list data, allocation data, cluster information and file structure information out of the hard disk drive 94. The data and information read out are displayed, as shown in FIG. 3. Subsequently, when the operator touches, e.g., the key 111 or 117 on the touch panel 61, the procedure shown in FIG. 19 is called and executed. When none of the image files is designated by the operator, the "display designated document" key 104, "change document name" key 111, "connect documents" key 112, "insert document" key 113, "delete page" key 114, "strike off" key 115 and "shift document" key 117 are displayed with half brightness, so that the operator does not touch them. Even if the operator touches any one of the above keys, the procedure of FIG. 19 is not called.

When the operator designates desired one of the image files displayed in the display area 106 (Yes, step S1), the main controller 70 recognizes the designated image file and highlights it (step S2). If the operator does not designate any image file (No, step S1) and if the operator touches the "shift document" key 117 (Yes, step S3), then the main controller 70 causes image file list data, allocation data, cluster information, and file structure information to be read out of the removable storing medium via the IPU 80.

Subsequently, the main controller 70 obtains the file number of the image file to be written to the storing medium first from the image file list data read out of the hard disk drive 94. The main controller 70 then obtains image numbers corresponding to the file number from the file structure information also read out of the hard disk drive 94. Further, the main controller 70 obtains image sizes corresponding to the image numbers from the allocation data read out of the hard disk drive 94 to thereby determine a total number of blocks required. Subsequently, the main controller 70 references the cluster information read out of the storing medium in order to obtain unoccupied regions for the image file, which correspond in number to the total number of blocks, and then determines the addresses of the blocks on the basis of block number. This can be done because all the blocks have the same size.

Further, by referencing the allocation data read out of the storing medium, the main controller 70 obtains unused image numbers whose image start addresses and image sizes are blank over all of the pages of the image file (when a unit image is one page). The main controller 70 then writes the address of the first one of the consecutive blocks while relating it to the image number of the first page of the image file.

The main controller 70 writes the image size obtained from the allocation data while relating it to the above image number. Further, the main controller 70 updates the first block to "occupied" and writes the address (calculated from the block number) of the second block next to the above block. The main controller 70 repeats such a procedure with the successive pages of the image file in order to update the allocation data and cluster information for the storing medium (step S25). The main controller 70 then delivers the image data of the first image file to the IPU 80 and causes it to write the image data in the blocks obtained in the storing medium (step S4).

After the step S4, the main controller 70 writes the image numbers in the file structure information for the storing medium and adds the image file list data of the first image file to the image file list data to thereby update the data (step S5). That is, the main controller 70 shifts the image file list data of the first image file from the image file list data stored the hard disk drive 94 to the image file list data for the storing medium. Also, the main controller 70 sets an unoccupied status in the blocks corresponding to the shifted image file of the cluster information for the hard disk drive 94.

Subsequently, the main controller 70 determines whether or not the image data and so forth of all the image files designated by the operator have been written to the storing medium (step S6). If the answer of the step S6 is No, then the main controller 70 repeats the step S4 and successive steps with the next image file. If the answer of the step S6 is Yes, then the main controller 70 delivers the updated image file list data, allocation data, cluster data and file structure information for the storing medium to the IPU 80 for thereby rewriting the data of the corresponding region of the storing medium (step S7). Also, the main controller 70 delivers the updated image file list data, allocation data, cluster information and file structure information for the hard disk drive 94 to the IPU 80 so as to rewrite the data of the corresponding region of the hard disk drive 94.

If the answer of the step S3 is No, meaning that the operator does not touch the "shift document" key 117, the program returns and executes processing associated with a key touched.

As stated above, the illustrative embodiment reduces the rewrite processing of the removable storing medium in the event of, e.g., rewriting of the image file list data and thereby extends the life of the storing medium while reducing the processing time.

Figure 20:
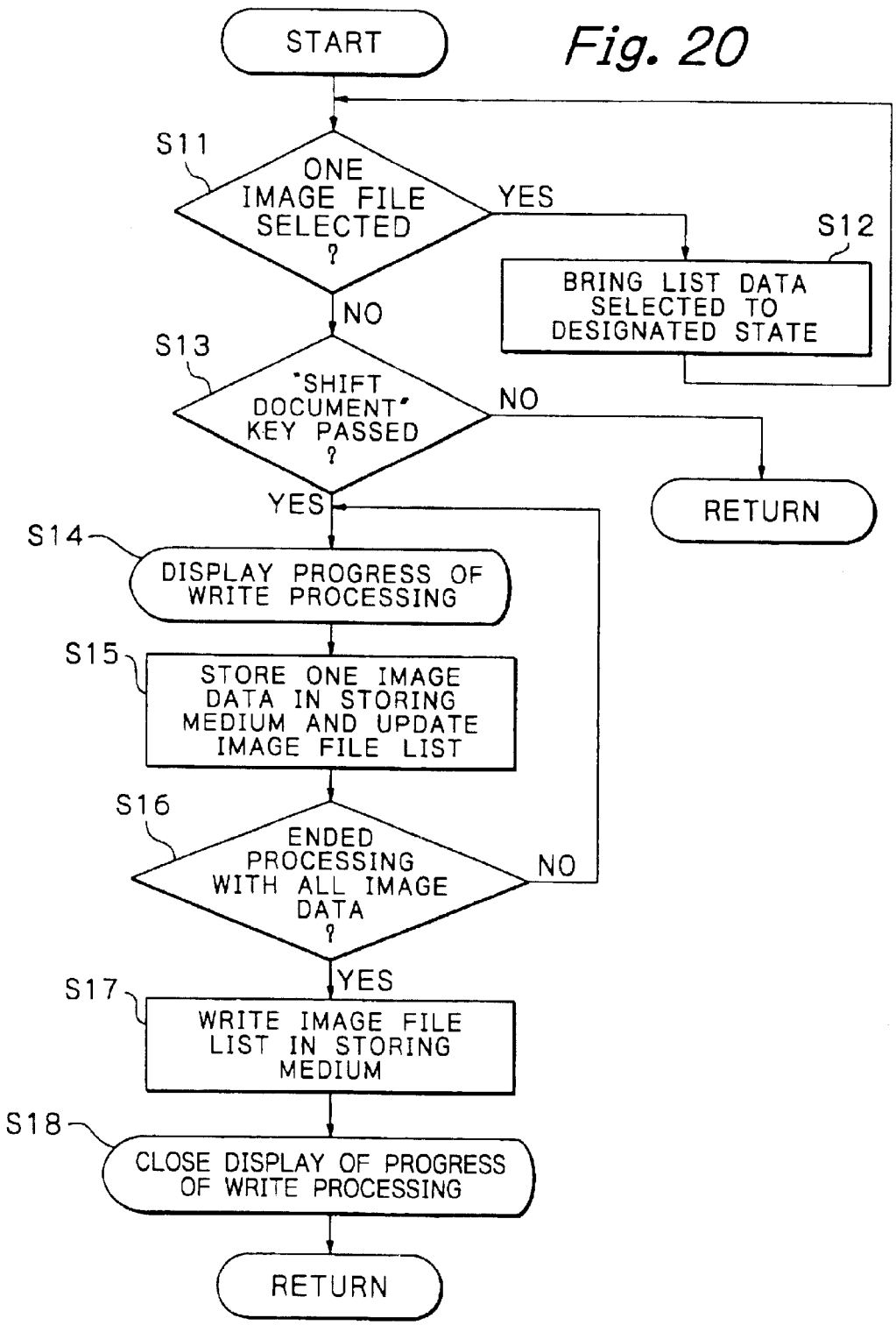
FIG. 20 is a flowchart representative of an alternative embodiment of the present invention.

Reference will be made to FIG. 20 for describing an alternative embodiment of the present invention. In the alternative embodiment, the main controller 70 displays on the touch panel 61 information that shows the operator the progress of the write processing, which is executed in the same manner as in the previous embodiment. Assume that the removable storing medium has stored some image files beforehand.

First, the operator presses the document key 76 on the operation panel 60. In response, the main controller 70 recognizes the manipulation and displays the picture shown in FIG. 3 in the same manner as in the previous embodiment. Subsequently, when the operator touches, e.g., the key 111 or 117 on the touch panel 61, the procedure shown in FIG. 20 is called and executed. When none of the image files is designated by the operator, the "display designated document" key 104, "change document name" key 111, "connect documents" key 112, "insert document" key 113, "delete page" key 114, "strike off" key 115 and "shift document" key 117 are displayed with half brightness, so that the operator does not touch them. Even if the operator touches any one of the above keys, the procedure of FIG. 19 is not called.

When the operator designates desired one of the image files displayed in the display area 106 (Yes, step S11), the main controller 70 recognizes the designated image file and highlights it (step S12). If the operator does not designate any image file (No, step S11) and if the operator touches the "shift document" key 117 (Yes, step S13), then the main controller 70 causes image file list data, allocation data, cluster information, and file structure information to be read out of the removable storing medium via the IPU 80.

Subsequently, the main controller 70 causes the progress of the write procedure (step S14) to be displayed, as shown in FIG. 12 specifically. Also, the main controller 70 delivers the image data of the first image file to the IPU 80 in the same manner as in the previous embodiment, so that the image data is written in the blocks obtained in the storing medium (step S15). Further, the main controller 70 updates the image file list data, allocation data, cluster information and file structure information for the storing medium and those for the hard disk drive 94 in the same manner as in the previous embodiment (step S15). As for the progress of the writing procedure, there may be displayed a message "Writing m-th one of n documents" and the name of the document being written, as shown in FIG. 12 specifically.

Subsequently, the main controller 70 determines whether or not the image data and so forth of all the image files designated by the operator have been written to the storing medium (step S16). If the answer of the step S16 is No, then the main controller 70 repeats the step S14 and successive steps with the next image file. If the answer of the step S16 is Yes, then the main controller 70 delivers the updated image file list data, allocation data, cluster data and file structure information for the storing medium to the IPU 80 for thereby rewriting the data of the corresponding region of the storing medium (step S17). Also, the main controller 70 delivers the updated image file list data, allocation data, cluster information and file structure information for the hard disk drive 94 to the IPU 80 so as to rewrite the data of the corresponding region of the hard disk drive 94. The main controller 70 then closes the display of the progress of the write processing and ends the procedure.

If the answer of the step S13 is No, meaning that the operator does not touch the "shift document" key 117, the program returns and executes processing associated with a key touched.

The information indicative of the progress of the write processing shown in FIG. 12 is only illustrative. For example, the touch panel 61 may display the amount of data having been written (e.g. megabytes) for the total amount of data indicated by the operator in the job or for the total capacity of the removable storing medium. Further, the touch panel 61 may display the number of unit images (e.g. pages) having been written for the total number of unit images constituting the image file. Moreover, the touch panel 61 may display the page number of an image file being written or the number of documents or pages having been written. It is to be noted that the total amount of data to be written is the sum of the size information included in the image file list data of FIG. 3.

To determine the amount of data having been written, every time a single image file is written, the size information of the image file may be added to the sum of the image sizes of images files having already been written. As for the number of unit images (e.g. pages) having been written, the IPU 80 controlling the write processing reports the end of writing of each unit image to the main controller 70, allowing the main controller 70 to count the unit images having been written.

As stated above, the illustrative embodiment, like the previous embodiment, reduces the rewrite processing of the removable storing medium in the event of rewriting of the image file list data and thereby extends the life of the storing medium while reducing the processing time. Further, the illustrative embodiment allows the operator to see the progress of the write processing. Therefore, even when a plurality of image files are sequentially written over a long period of time, the operator is free from uneasiness and can presume the time when the write processing will end.

Another alternative embodiment of the present invention will be described with reference to FIG. 21. The embodiment to be described allows the operator to stop the write processing described in relation to the previous embodiments. Specifically, the operator presses the document key 76 on the operation panel 60. In response, the main controller 70 recognizes it and displays the picture shown in FIG. 3 in the same manner as in the previous embodiments. Subsequently, when the operator touches, e.g., the key 111 or 117 on the touch panel 61, the procedure shown in FIG. 21 is called and executed. When none of the image files is designated by the operator, the "display designated document" key 104, "change document name" key 111, "connect documents" key 112, "insert document" key 113, "delete page" key 114, "strike off" key 115 and "shift document" key 117 are displayed with half brightness, so that the operator does not touch them. Even if the operator touches any one of the above keys, the procedure of FIG. 19 is not called.

When the operator designates desired one of the image files displayed in the display area 106 (Yes, step S21), the main controller 70 recognizes the designated image file and highlights it (step S22). If the operator does not designate any image file (No, step S21) and if the operator touches the "shift document" key 117 (Yes, step S23), then the main controller 70 causes image file list data, allocation data, cluster information, and file structure information to be read out of the removable storing medium via the IPU 80.

Subsequently, the main controller 70 causes the progress of the writing procedure to be displayed (step S24), as shown in FIG. 12 specifically. Also, the main controller 70 delivers the image data of the first image file to the IPU 80 in the same manner as in the previous embodiments, so that the image data is written in the blocks obtained in the storing medium (step S25).

The main controller 70 determines whether or not the operator has touched a "stop transfer" key 124 (see FIG. 12) while the write processing is under way (step S26). If the answer of the step S26 is Yes, then the main controller 70 writes the page being written to the end of the page (step S27) and then invalidates the image data and so forth of the image file having been written halfway in the storing medium (step S28). For example, if the status "occupied" has already been set in the blocks of the storing medium allocated to the image file, then the main controller 70 replaces it with the status "unoccupied". If no statuses have been set in the above blocks, the main controller 70 does not deal with such blocks. Further, the main controller 70 sets the unused status in the image numbers attached to the image file being processed, i.e., clears the start addresses and size information corresponding to the image numbers present in the allocation data. In addition, the main controller 70 does not add the image file being processed to the image file list data. As a result, the image data and so forth of the image file written to the storing medium halfway is dealt with as data absent in the allocated blocks (memory region).

Further, the main controller 70 delivers the updated image file list data, allocation data, cluster information and file structure information for the storing medium to the IPU 80 so as to rewrite the data of the corresponding region of the storing medium (step S29). Also, the main controller delivers the updated image file list data, allocation data, cluster information and file structure information for the hard disk drive 94 to the IPU 80 so as to rewrite the data of the corresponding region of the hard disk drive 94. The main controller 70 then closes the display of the progress of the write processing and causes another image to appear (step S30).

Assume that the image data of the image file being processed are fully written in the storing means without the "stop transfer" key 124 being touched (No. step S26). Then, the main controller 70 adds the image file list data (attribute information) of the above image data to the image file list data of the storing medium to thereby update the image file list data (step S31). In addition, the main controller 70 updates the allocation data, cluster information, and file structure information.

Subsequently, the main controller 70 determines whether or not the image data and so forth of all the image files designated by the operator have been written to the storing medium (step S32). If the answer of the step S32 is No, then the main controller 70 repeats the step S25 and successive steps with the next image file. If the answer of the step S32 is Yes, then the main controller 70 delivers the updated image file list data, allocation data, cluster data and file structure information for the storing medium to the IPU 80 for thereby rewriting the data of the corresponding region of the storing medium (step S29). Also, the main controller 70 delivers the updated image file list data, allocation data, cluster information and file structure information for the hard disk drive 94 to the IPU 80 so as to rewrite the data of the corresponding region of the hard disk drive 94. The main controller 70 then closes the display of the progress of the write processing (step S30) and ends the procedure.

If the answer of the step S2 is No, meaning that the operator does not touch the "shift document" key 117, the program returns and executes processing associated with a key touched.

As stated above, the illustrative embodiment, like the previous embodiments, reduces the rewrite processing of the removable storing medium in the event of rewriting of the image file list data and thereby extends the life of the storing medium while reducing the processing time. Also, when a job given priority, e.g., the copying of a document image occurs, the job can be immediately executed without making the operator wait until the end of the writing of a plurality of image files. Further, in the event of the stop of the write processing, the unit image being written is written to the end thereof, promoting easy control over the write processing and easy data management in the apparatus. In addition, because the image file having been written halfway is invalidated, the limited capacity of the storing medium can be effectively used. It is noteworthy that image files written before the interrupted image file are not invalidated and are added to the image file list data and therefore do not have to be again written to the storing medium (shift).

The illustrative embodiments shown and described have concentrated on the shift of image information (image data and management information including image file list data) from the hard disk drive 94 to the removable storing medium. The present invention is similarly practicable when the image information stored in the hard disk drive 94 should be copied in the removable storing medium.

In summary, it will be seen that the present invention provides an image processing apparatus having various unprecedented advantages, as enumerated below.

(1) List data can be updated with a minimum of write processing to be executed with a removable storing medium. This successfully extends the life of the storing medium and reduces the processing time.

(2) The operator of the apparatus can see the progress of the write processing and is therefore free from uneasiness when image files are sequentially written in the storing medium over a long period of time, and can presume the time when the processing will end. The progress of the write processing may be represented by the amount of image data actually written for the total amount of image data selected, so that the above advantage can be easily achieved. Alternatively, the progress of the write processing may be represented by the number of unit images having been written for the total number of unit images contained in image information being written. This allows the operator to see the progress of the write processing minutely. Further, the progress of the write processing may be represented by the name of image information being written. This is easy to practice and allows the operator, who knows the order of image data to be sent, to readily see the progress.

(3) When the operator commands the end of the writing operation under way, the writing operation ends only after a unit image being written has been written to the end thereof. This promotes easy control over the writing operation and easy data management in the apparatus.

(4) When the write processing is caused to end before all the unit images contained in the image information have been written, the image information of the image file being written are invalidated. As a result, the image data being written halfway are dealt with as data absent in the storing medium, promoting the efficient use of the storing medium.

(5) As for image information having been written to the storing medium before the end of the write processing, list data are updated and then written to the storing medium. It is therefore not necessary to again write the above image information in the storing medium.

Various modifications will become possible for those skilled in the art after receiving the teachings of the present disclosure without departing from the scope thereof.

What is claimed is:

1. An image processing apparatus comprising:
    means for storing image data representative of a single unit image or a plurality of unit images;
    means for writing the image data in a removable storing medium;
    means for storing list data listing the image data stored in either one of said means for storing image data and said storing medium;
    means for selecting, among the image data stored in said means for storing image data, image data to be written to said storing medium; and
    means for updating, when the image data selected by said means for selecting are written to said storing medium, the list data stored in said means for storing list data every time said means for writing writes one image data, and causing, after all the image information selected have been written to said storing medium, said list data to be written to said storing medium.

2. An apparatus as claimed in claim 1, further comprising means for displaying a progress of a write processing.

3. An apparatus as claimed in claim 2, wherein the progress of the write processing is represented by an amount of image data actually written for a total amount of image information selected by said means for selecting.

4. An apparatus as claimed in claim 3, further comprising:
    means for commanding a stop of the write processing being executed by said means for writing; and
    means for stopping, causing, in response to a stop command input from said means for commanding a stop of the write processing, said means for writing to stop the write processing after a unit image being written to said storing medium has been fully written.

5. An apparatus as claimed in claim 4, further comprising means for invalidating, when said means for stopping stops the write processing before all unit images contained in the image data are fully written to said storing medium, corresponding image data stored in said storing medium.

6. An apparatus as claimed in claim 4, wherein said means for updating updates the list data only with the image data having been written to said storing medium before a stop of the write processing.

7. An apparatus as claimed in claim 2, wherein the progress of the write processing is represented by a number of unit images having been written to said storing medium for a total number of unit images contained in the image data being written to said storing medium.

8. An apparatus as claimed in claim 7, further comprising:
    means for commanding a stop of the write processing being executed by said means for writing; and
    means for stopping, causing, in response to a stop command input from said means for commanding a stop of the write processing, said means for writing to stop the write processing after a unit image being written to said storing medium has been fully written.

9. An apparatus as claimed in claim 8, further comprising means for invalidating, when said means for stopping stops the write processing before all unit images contained in the image data are fully written to said storing medium, corresponding image data stored in said storing.

10. An apparatus as claimed in claim 8, wherein said means for updating updates the list data only with the image data having been written to said storing medium before a stop of the write processing.

11. An apparatus as claimed in claim 2, wherein the progress of the write processing is represented by a name of the image data being written.

12. An apparatus as claimed in claim 11, further comprising:
    means for commanding a stop of the write processing being executed by said means for writing; and
    means for stopping, causing, in response to a stop command input from said means for commanding a stop of the write processing, said means for writing to stop the write processing after a unit image being written to said storing medium has been fully written.

13. An apparatus as claimed in claim 12, further comprising means for invalidating, when said means for stopping stops the write processing before all unit images contained in the image data are fully written to said storing medium, corresponding image data stored in said storing.

14. An apparatus as claimed in claim 12, wherein said means for updating updates the list data only with the image data having been written to said storing medium before a stop of the write processing.

15. An apparatus as claimed in claim 2, further comprising:
    means for commanding a stop of the write processing being executed by said means for writing; and
    means for stopping, causing, in response to a stop command input from said means for commanding a stop of the write processing, said means for writing to stop the write processing after a unit image being written to said storing medium has been fully written.

16. An apparatus as claimed in claim 15, further comprising means for invalidating, when said means for stopping stops the write processing before all unit images contained in the image data are fully written to said storing medium, corresponding image data stored in said storing.

17. An apparatus as claimed in claim 15, wherein said means for updating updates the list data only with the image data having been written to said storing medium before a stop of the write processing.

18. An apparatus as claimed in claim 1, further comprising:
means for commanding a stop of the write processing being executed by said means for writing; and
means for stopping, causing, in response to a stop command input from said means for commanding a stop of the write processing, said means for writing to stop the write processing after a unit image being written to said storing medium has been fully written.

19. An apparatus as claimed in claim 18, further comprising means for invalidating, when said means for stopping stops the write processing before all unit images contained in the image data are fully written to said storing medium, corresponding image data stored in said storing.

20. An apparatus as claimed in claim 18, wherein said means for updating updates the list data only with the image data having been written to said storing medium before a stop of the write processing.

21. An image processing apparatus comprising:
a device configured to store image data representative of a single unit image or a plurality of unit images;
a writing device configured to write the image data in a removable storing medium;
a device configured to store list data listing the image data stored in either one of said device configured to store image data and said storing medium;
a selector configured to select, among the image data stored in said device configured to store image data, image data to be written to said storing medium; and
a controller configured to update, when the image data selected by said selector are written to said storing medium, the list data stored in said device configured to store list data every time said writing device writes one image data, and causing, after all the image information selected have been written to said storing medium, said list data to be written to said storing medium.

22. An apparatus as claimed in claim 21, further comprising a display configured to display a progress of a write processing.

23. An apparatus as claimed in claim 22, wherein the progress of the write processing is represented by an amount of image data actually written for a total amount of image information selected by said selector.

24. An apparatus as claimed in claim 23, further comprising:
a device configured to command a stop of the write processing being executed by said writing device; and
a stopping device configured to cause, in response to a stop command input from said device configured to command a stop of the write processing, said writing device to stop the write processing after a unit image being written to said storing medium has been fully written.

25. An apparatus as claimed in claim 24, further comprising a device configured to invalidate, when said stopping device stops the write processing before all unit images contained in the image data are fully written to said storing medium, corresponding image data stored in said storing medium.

26. An apparatus as claimed in claim 24, wherein said controller updates the list data only with the image data having been written to said storing medium before a stop of the write processing.

27. An apparatus as claimed in claim 22, wherein the progress of the write processing is represented by a number of unit images having been written to said storing medium for a total number of unit images contained in the image data being written to said storing medium.

28. An apparatus as claimed in claim 27, further comprising:
a device configured to command a stop of the write processing being executed by said writing device; and
a stopping device configured to cause, in response to a stop command input from said device configured to command a stop of the write processing, said writing device to stop the write processing after a unit image being written to said storing medium has been fully written.

29. An apparatus as claimed in claim 28, further comprising a device configured to invalidate, when said stopping device stops the write processing before all unit images contained in the image data are fully written to said storing medium, corresponding image data stored in said storing medium.

30. An apparatus as claimed in claim 28, wherein said controller updates the list data only with the image data having been written to said storing medium before a stop of the write processing.

31. An apparatus as claimed in claim 22, wherein the progress of the write processing is represented by a name of the image data being written.

32. An apparatus as claimed in claim 31, further comprising:
a device configured to command a stop of the write processing being executed by said writing device; and
a stopping device configured to cause, in response to a stop command input from said device configured to command a stop of the write processing, said writing device to stop the write processing after a unit image being written to said storing medium has been fully written.

33. An apparatus as claimed in claim 32, further comprising a device configured to invalidate, when said stopping device stops the write processing before all unit images contained in the image data are fully written to said storing medium, corresponding image data stored in said storing medium.

34. An apparatus as claimed in claim 32, wherein said controller updates the list data only with the image data having been written to said storing medium before a stop of the write processing.

35. An apparatus as claimed in claim 22, further comprising:
a device configured to command a stop of the write processing being executed by said writing device; and
a stopping device configured to cause, in response to a stop command input from said device configured to command a stop of the write processing, said writing device to stop the write processing after a unit image being written to said storing medium has been fully written.

36. An apparatus as claimed in claim 35, further comprising a device configured to invalidate, when said stopping device stops the write processing before all unit images contained in the image data are fully written to said storing medium, corresponding image data stored in said storing medium.

37. An apparatus as claimed in claim 35, wherein said controller updates the list data only with the image data having been written to said storing medium before a stop of the write processing.

38. An apparatus as claimed in claim 21, further comprising:

a device configured to command a stop of the write processing being executed by said writing device; and a stopping device configured to cause, in response to a stop command input from said device configured to command a stop of the write processing, said writing device to stop the write processing after a unit image being written to said storing medium has been fully written.

39. An apparatus as claimed in claim 38, further comprising a device configured to invalidate, when said stopping device stops the write processing before all unit images contained in the image data are fully written to said storing medium, corresponding image data stored in said storing.

40. An apparatus as claimed in claim 38, wherein said controller updates the list data only with the image data having been written to said storing medium before a stop of the write processing.

* * * * *